US011949151B2

(12) United States Patent
Hwang

(10) Patent No.: US 11,949,151 B2
(45) Date of Patent: Apr. 2, 2024

(54) SMART ANTENNA MODULE FOR VEHICLE

(71) Applicant: AMOTECH CO., LTD., Incheon (KR)

(72) Inventor: Chul Hwang, Incheon (KR)

(73) Assignee: AMOTECH CO., LTD., Incheon (KR)

(*) Notice: Subject to any disclaimer, the term of this patent is extended or adjusted under 35 U.S.C. 154(b) by 162 days.

(21) Appl. No.: 17/767,233

(22) PCT Filed: Sep. 24, 2020

(86) PCT No.: PCT/KR2020/012970
§ 371 (c)(1),
(2) Date: Apr. 7, 2022

(87) PCT Pub. No.: WO2021/071143
PCT Pub. Date: Apr. 15, 2021

(65) Prior Publication Data

US 2022/0376384 A1 Nov. 24, 2022

(30) Foreign Application Priority Data

Oct. 7, 2019 (KR) ........................ 10-2019-0123977

(51) Int. Cl.
*H01Q 1/32* (2006.01)
*H01Q 1/12* (2006.01)
*H01Q 1/48* (2006.01)

(52) U.S. Cl.
CPC ................. *H01Q 1/32* (2013.01); *H01Q 1/12* (2013.01); *H01Q 1/48* (2013.01)

(58) Field of Classification Search
CPC ...... H01Q 1/32; H01Q 1/3208; H01Q 1/3216; H01Q 1/3275; H01Q 1/12; H01Q 1/521; H01Q 1/523; H01Q 1/48; H01Q 9/26; H01Q 21/00
See application file for complete search history.

(56) References Cited

U.S. PATENT DOCUMENTS

2006/0139218 A1 6/2006 Jang
2019/0027818 A1* 1/2019 Ortigosa ................ H01Q 1/246

FOREIGN PATENT DOCUMENTS

CN 110247199 A * 9/2019 ........... H01Q 1/3208
KR 20-0389414 Y1 7/2005
KR 10-2006-0073767 A 6/2006
KR 10-2009-0075464 A 7/2009
KR 10-1350500 B1 1/2014
KR 10-2018-0025066 A 3/2018
WO 2018/043808 A1 3/2018

OTHER PUBLICATIONS

KR Office Action dated Aug. 29, 2021 as received in Application No. 10-2019-0123977.
KR Decision to Grant dated Nov. 16, 2021 as received in Application No. 10-2019-0123977.

* cited by examiner

*Primary Examiner* — Hoang V Nguyen
(74) *Attorney, Agent, or Firm* — Maschoff Brennan

(57) ABSTRACT

Proposed is a smart antenna module for a vehicle in which a plurality of cellular antennas are mounted in a non-ground area and spaced apart from a ground pattern to minimize mutual interference. In the proposed smart antenna module for a vehicle, a first antenna is disposed in a ground area of a base substrate, the cellular antennas are disposed in a non-ground area of the base substrate, and the cellular antennas are electrically connected to the ground area of the lower surface of the base substrate.

10 Claims, 10 Drawing Sheets

[FIG. 1]
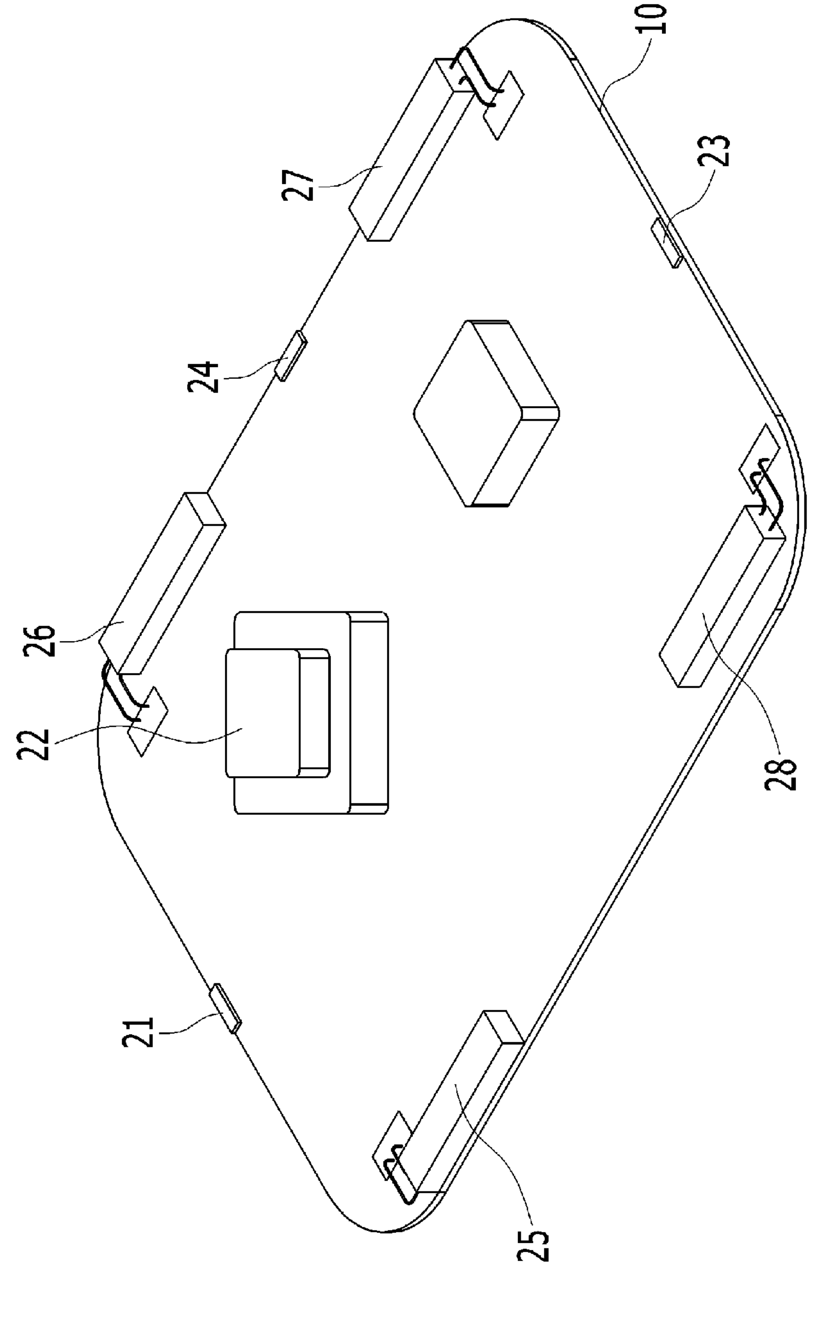

[FIG. 2]
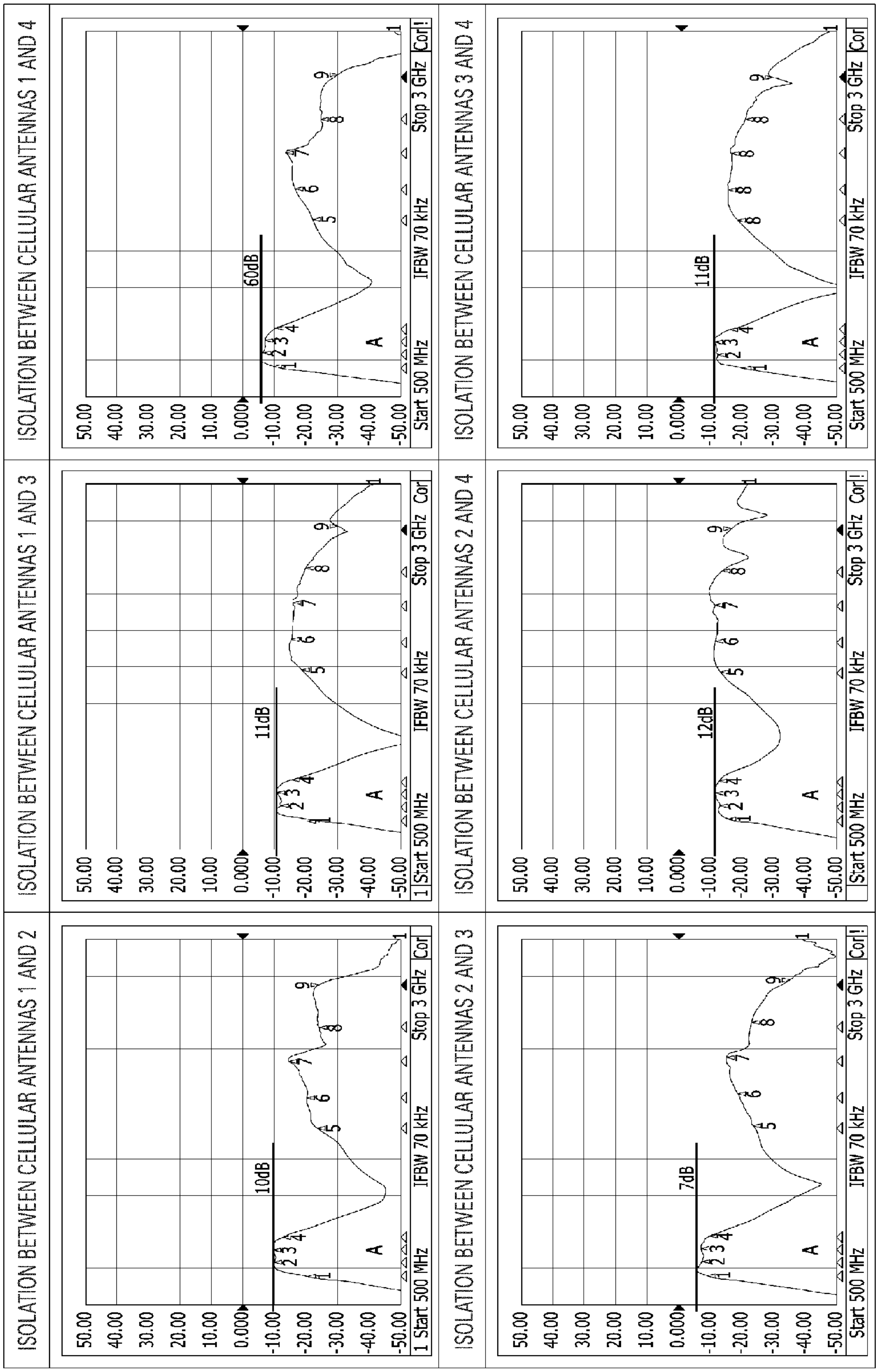

[FIG. 3]
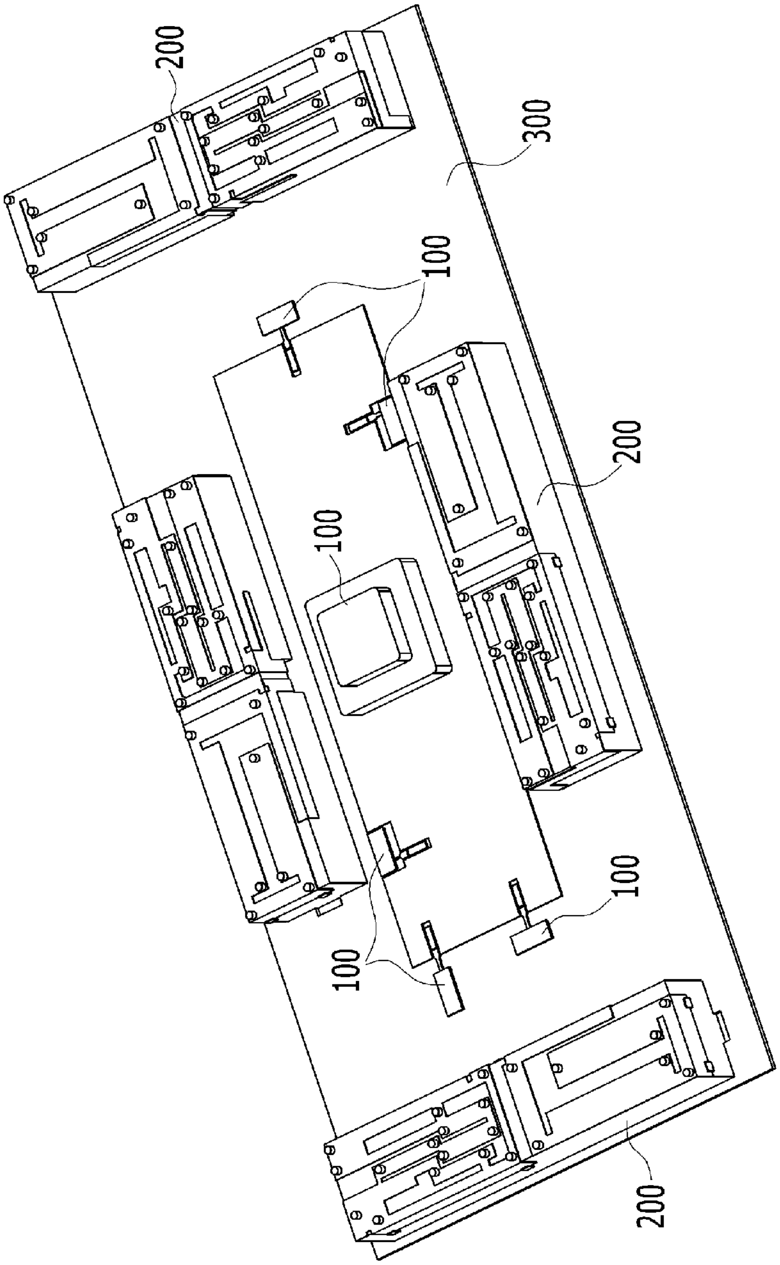

[FIG. 4]
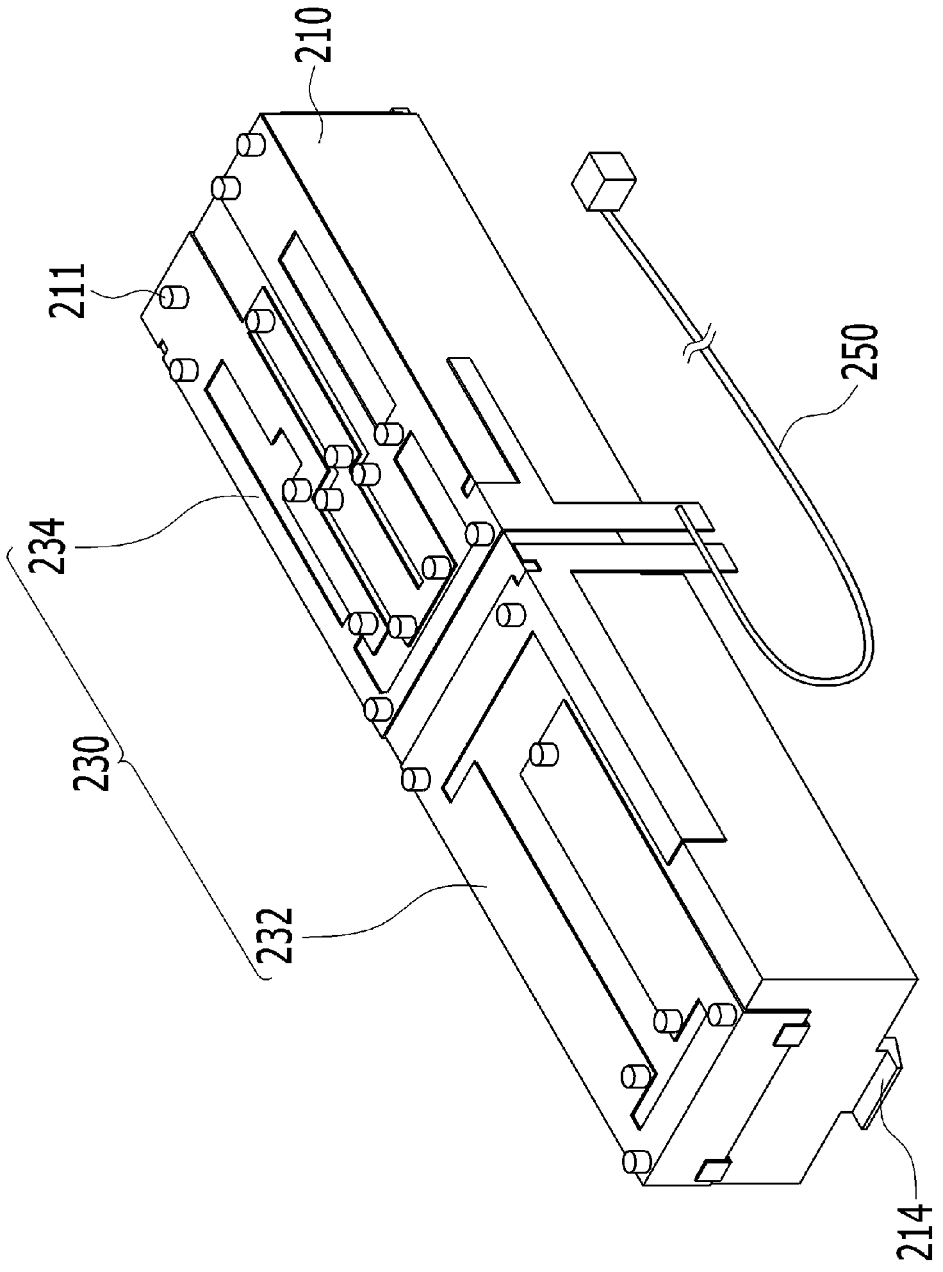

[FIG. 5]
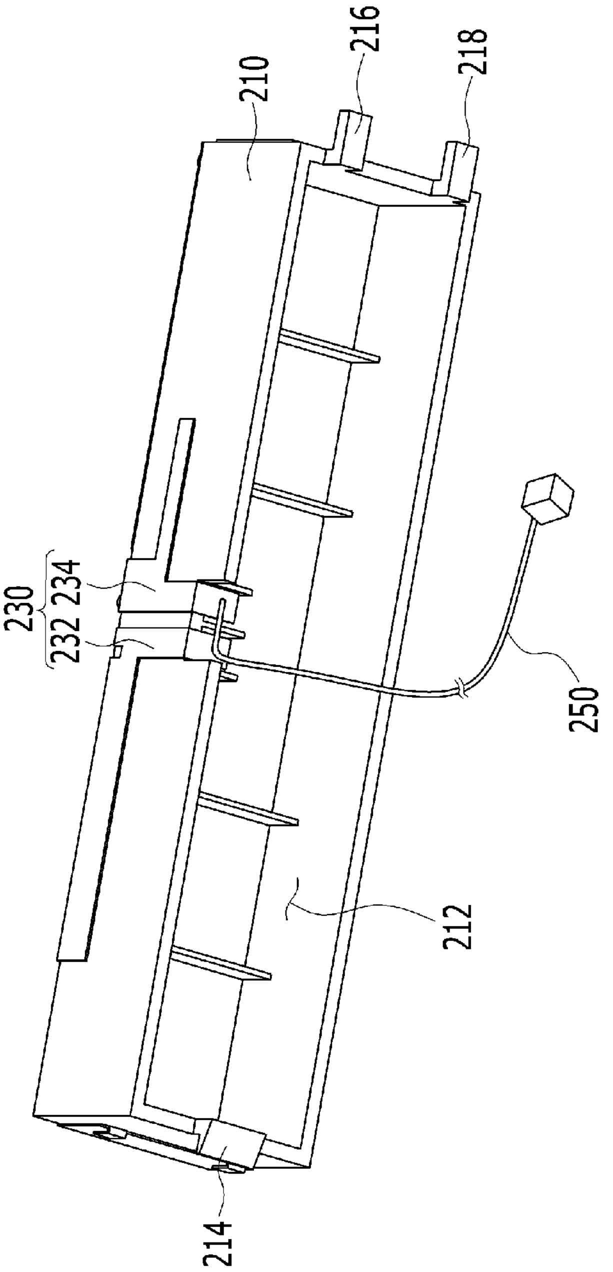

[FIG. 6]
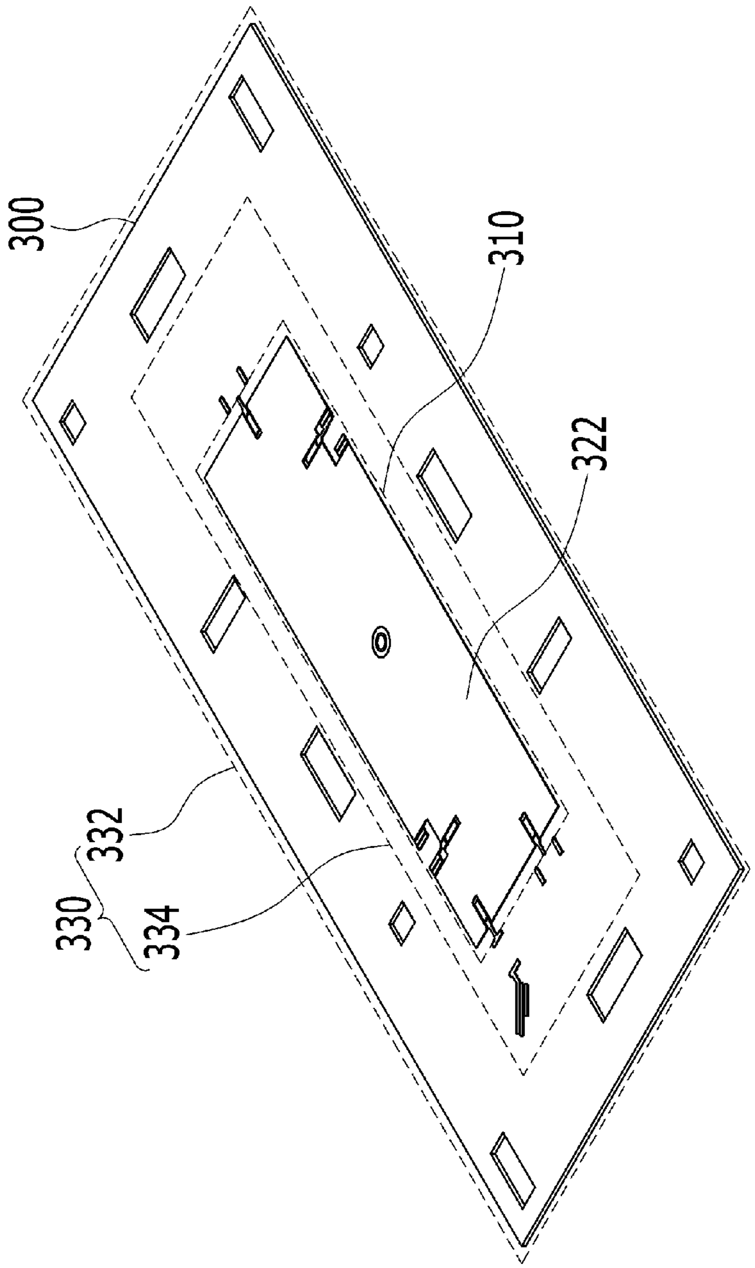

[FIG. 7]
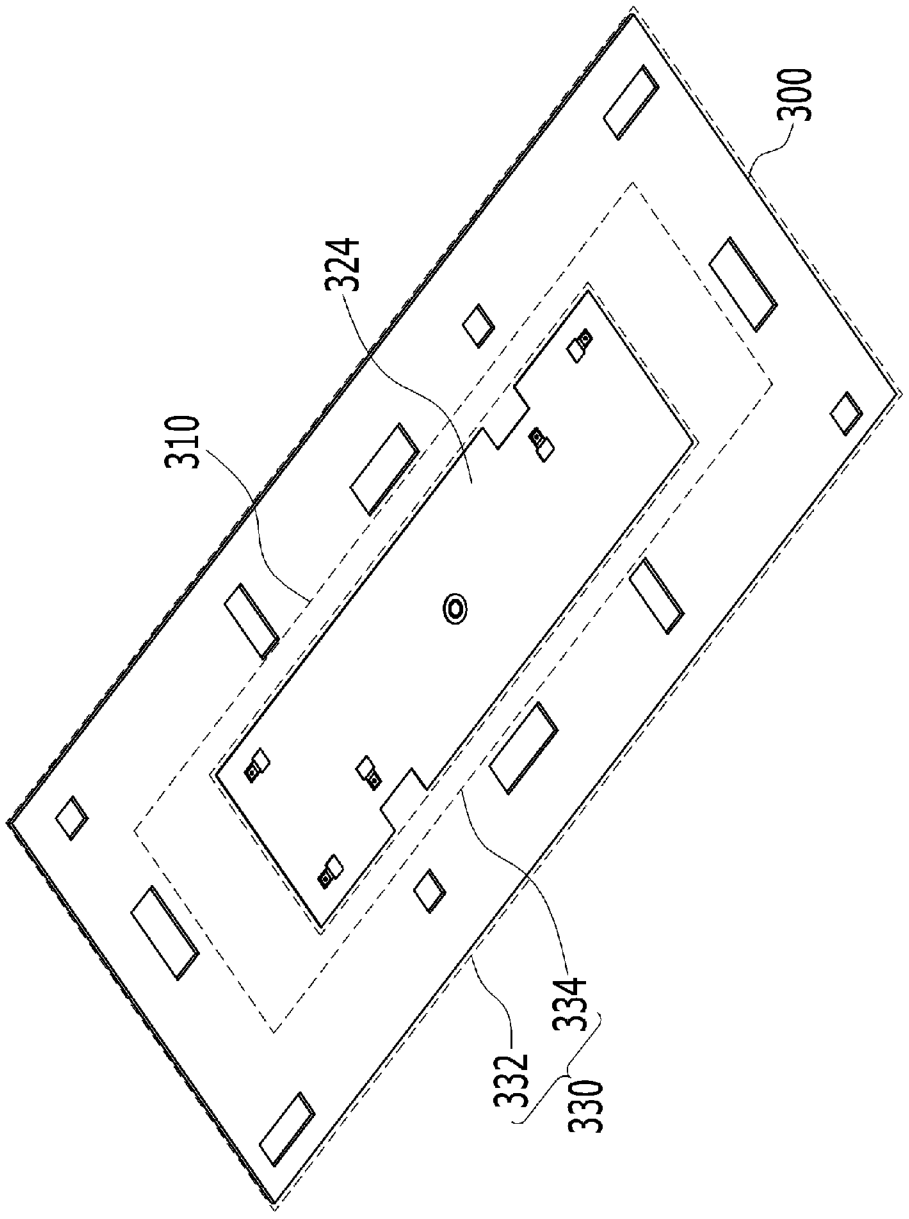

[FIG. 8]
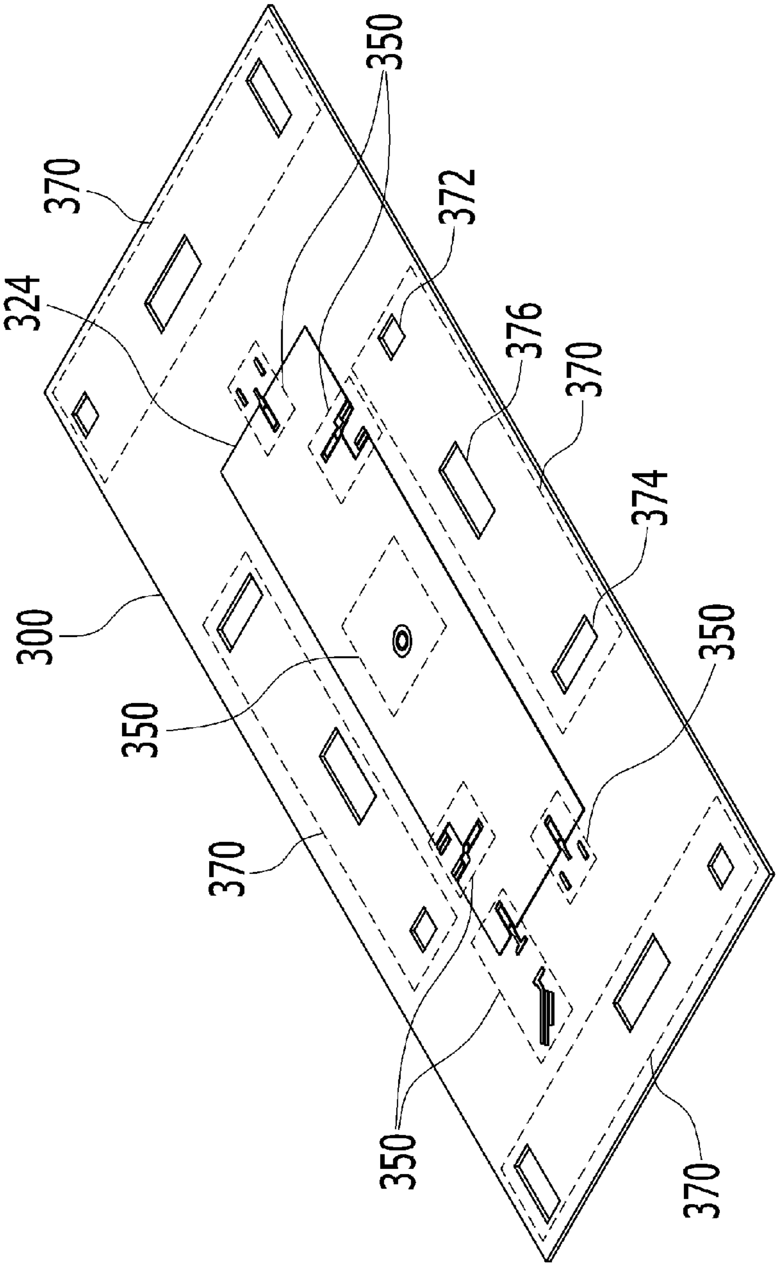

[FIG. 9]
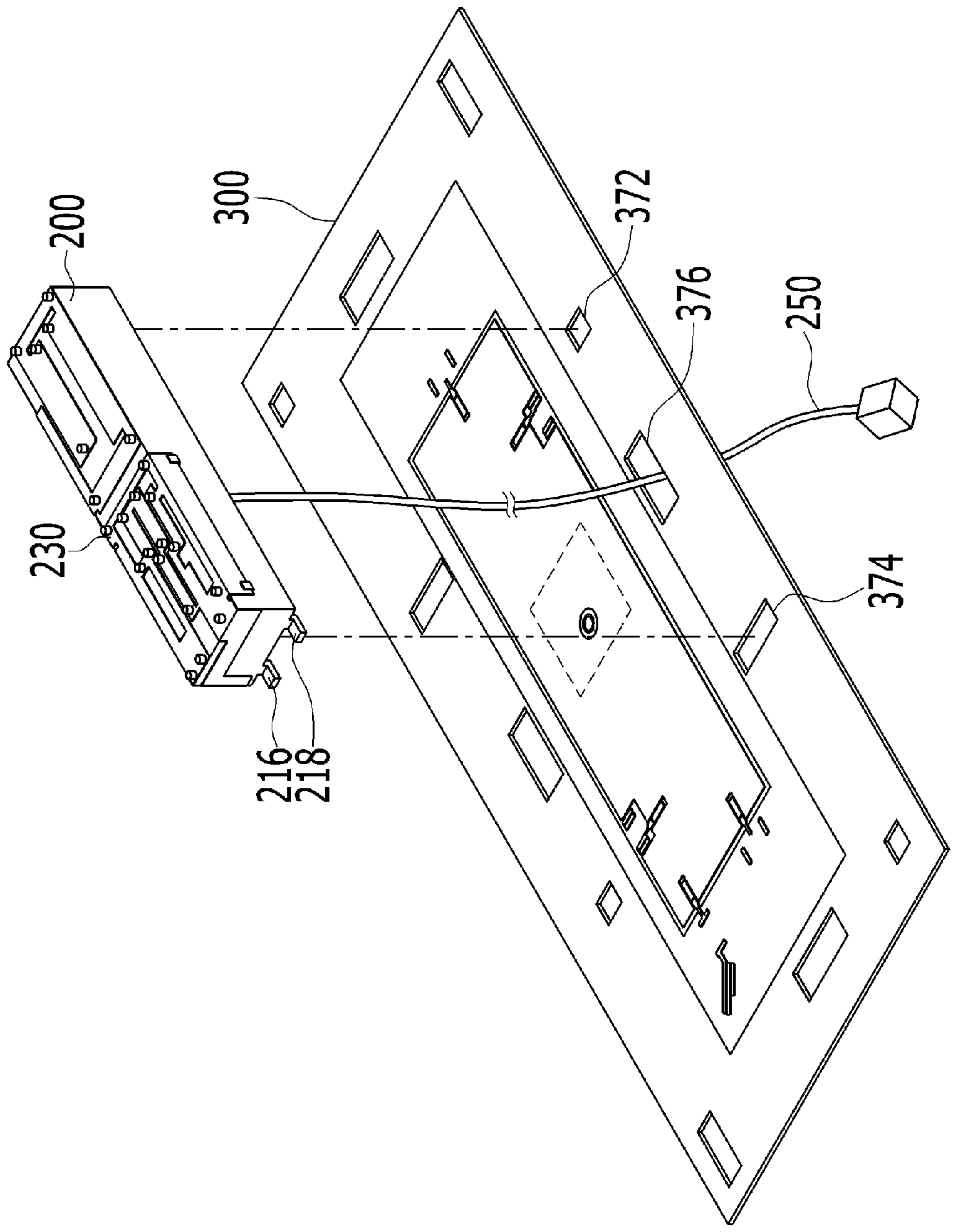

[FIG. 10]
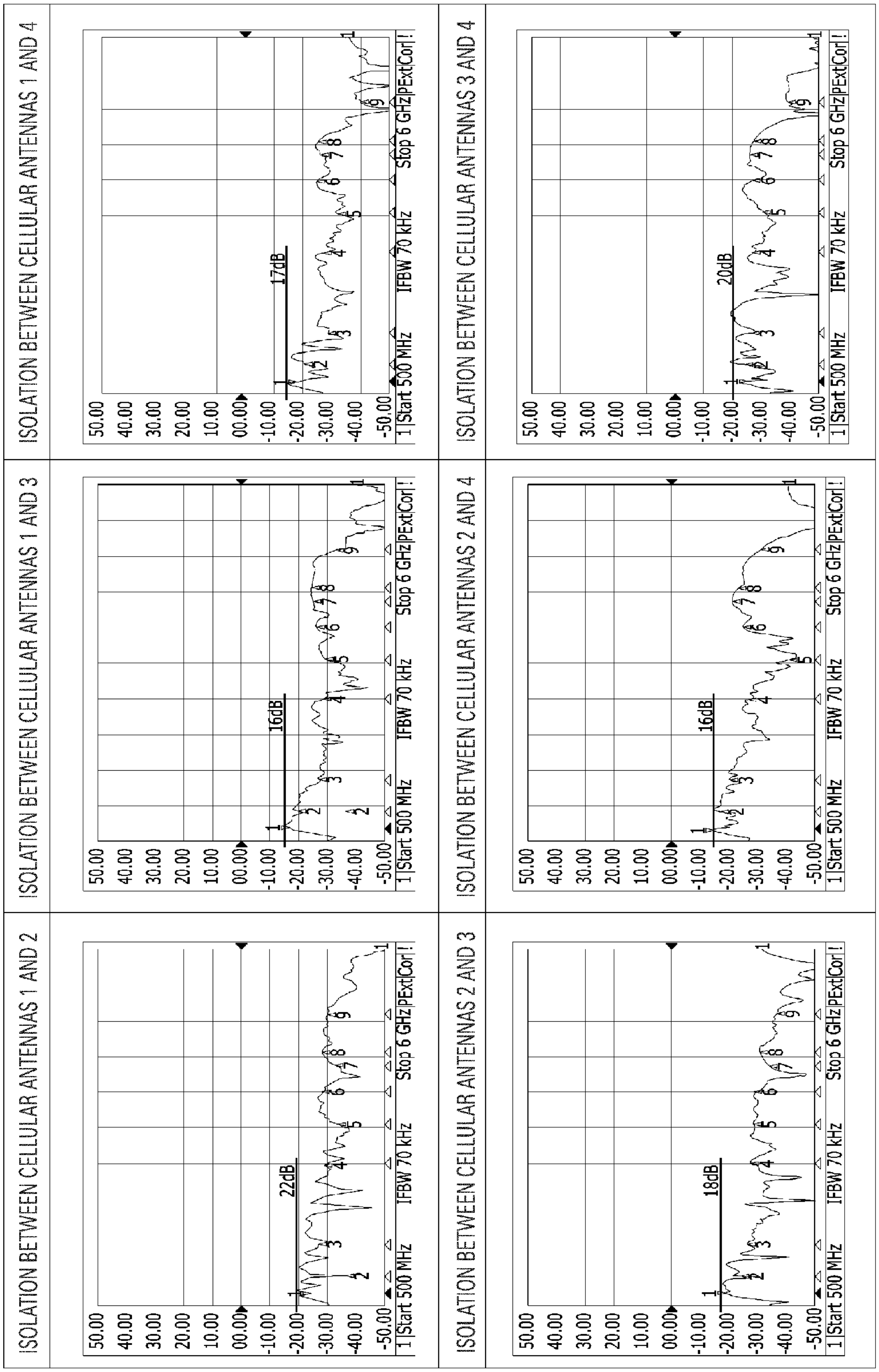

SMART ANTENNA MODULE FOR VEHICLE

TECHNICAL FIELD

The present disclosure relates to an antenna module installed in a vehicle, and more specifically, to a smart antenna module for a vehicle, which is installed in a vehicle to support communication in various frequency bands including a V2X band.

BACKGROUND ART

A smart antenna module for a vehicle is an antenna module in which a plurality of antennas are mounted on one printed circuit board and installed in a vehicle to support a Vehicle to Everything communication (V2X) communication through various frequency bands.

A general smart antenna module for a vehicle supports the V2X communication by using a frequency band such as a global navigation satellite system (GNSS), WIFI, or Bluetooth (BLE).

Recently, in the automobile industry, research is being conducted on adding an autonomous driving function to a vehicle. Since the vehicle needs to quickly transmit and receive a large amount of data to and from nearby vehicles and objects in order to safely operate the autonomous driving function, research on the smart antenna module for the vehicle that supports the cellular V2X communication is being conducted.

However, the conventional smart antenna module for the vehicle has a problem in that as a plurality of cellular antennas are added, interference between the antennas increases, thereby lowering the isolation performance of the cellular antenna.

SUMMARY OF INVENTION

Technical Problem

The present disclosure has been proposed to solve the conventional problem, and an object of the present disclosure is to provide a smart antenna module for a vehicle, which mounts a plurality of cellular antennas in a non-ground area and separates them from a ground pattern to minimize mutual interference.

Solution to Problem

In order to achieve the object, a smart antenna module for a vehicle according to an exemplary embodiment of the present disclosure includes: a base substrate having a ground area disposed in the center thereof and a non-ground area disposed on an outer circumference of the ground area, a first antenna disposed in the ground area of the base substrate, and a cellular antenna disposed in the non-ground area of the base substrate.

The base substrate may include an upper ground pattern formed in the ground area of an upper surface of the base substrate and a lower ground pattern formed in the ground area of a lower surface of the base substrate, the ground area of the base substrate may be formed with a first mounting area in which a first antenna is mounted, and the first mounting area may include a clearance area of the non-ground area.

The non-ground area may be formed with an antenna mounting area in which the cellular antenna is mounted, and the antenna mounting area may be formed with one or more fitting holes into which a fitting protrusion of the cellular antenna is inserted and fixed and a through hole through which a ground wire of the cellular antenna penetrates. At this time, the fitting hole may include a first fitting hole into which the fitting protrusion formed on one side of the cellular antenna is inserted and a second fitting hole into which another fitting protrusion formed on the other side of the cellular antenna is inserted, and the through hole may be disposed between the first fitting hole and the second fitting hole.

Meanwhile, the non-ground area may also be further formed with a clearance area disposed between the antenna mounting area and the ground area to separate the antenna mounting area from the ground area.

The cellular antenna may include a guide substrate of a polyhedral shape having an opening formed in one surface facing the base substrate and mounted with a radiator. An empty space may be formed inside the guide substrate, and the guide substrate may be formed with a guide protrusion on a surface on which the radiator is mounted.

The cellular antenna may further include a ground wire having one end electrically connected to the radiator and the other end penetrating a through hole formed in an antenna mounting area of the base substrate, and the other end of the ground wire may be electrically connected to the ground area formed on a lower surface of the base substrate.

The guide substrate may include a fitting protrusion fitted into and coupled to a fitting hole formed in the non-ground area of the base substrate, and the fitting protrusion may include a first fitting protrusion formed on one side of the guide substrate and fitted into and coupled to a first fitting hole formed in the non-ground area of the base substrate and a second fitting protrusion formed on the other side of the guide substrate and fitted into and coupled to a second fitting hole formed in the non-ground area of the base substrate.

Advantageous Effects of Invention

According to the present disclosure, the smart antenna module for the vehicle may mount the plurality of cellular antennas in the non-ground area and separate the plurality of cellular antennas from the ground pattern through the clearance area of the non-ground area, thereby minimizing the interference between the plurality of cellular antennas.

In addition, the smart antenna module for the vehicle may separate the plurality of cellular antennas from the ground pattern through the clearance area of the non-ground area, thereby minimizing the interference between the plurality of cellular antennas to satisfy the isolation performance required by the automobile industry.

BRIEF DESCRIPTION OF DRAWINGS

FIGS. 1 and 2 are views for describing a general smart antenna module for a vehicle.

FIG. 3 is a view for describing a smart antenna module for a vehicle according to an exemplary embodiment of the present disclosure.

FIGS. 4 and 5 are views for describing the cellular antenna of FIG. 3.

FIGS. 6 to 9 are views for describing a base substrate of FIG. 3.

FIG. 10 is a graph in which the isolation performance of the smart antenna module for the vehicle has been measured according to the exemplary embodiment of the present disclosure.

DESCRIPTION OF EMBODIMENTS

Hereinafter, the most preferred exemplary embodiments of the present disclosure will be described with reference to the accompanying drawings in order to specifically describe the exemplary embodiments so that those skilled in the art to which the present disclosure pertains may easily implement the technical spirit of the present disclosure. First, in adding reference numerals to the components of each drawing, it should be noted that the same components have the same reference numerals as much as possible even if they are illustrated in different drawings. In addition, in describing the present disclosure, when it is determined that the detailed description of the related well-known configuration or function may obscure the gist of the present disclosure, the detailed description thereof will be omitted.

Referring to FIG. 1, a general smart antenna module for a vehicle includes: a base substrate 10 and a plurality of antennas 21 to 28 mounted on the base substrate 10.

The base substrate 10 is configured as a printed circuit board (PCB, ground plane). A ground is formed over almost the entire area of the base substrate 10, and the plurality of antennas are mounted on the ground of the base substrate 10. At this time, the plurality of antennas are configured to include a Vehicle to Everything (V2X) communication antenna 21, a global navigation satellite system (GNSS) antenna 22, a WIFI antenna 23, a Bluetooth (BLE) antenna 24, and cellular antennas (25 to 28).

In the general smart antenna module for the vehicle, since all of the plurality of antennas 21 to 28 are disposed within one ground area, the interference between the cellular antennas 21 to 28 increases. Therefore, as shown in FIG. 2, the isolation performance between the cellular antennas 21 to 28 installed in the general smart antenna module for the vehicle is measured to be about 6 dB to 12 dB, and does not satisfy the isolation standard by the automobile industry in which the isolation performance of about 12 dB or more is required.

The exemplary embodiment of the present disclosure presents the smart antenna module for the vehicle, which classifies the base substrate into a ground area and a non-ground area, mounts the conventional antennas in the ground area, and mounts additional cellular antennas in the non-ground area, thereby preventing the isolation from being lowered by the interference between the antennas.

Referring to FIG. 3, the smart antenna module for the vehicle according to the exemplary embodiment of the present disclosure includes a plurality of first antennas 100, a plurality of cellular antennas 200, and a base substrate 300.

The plurality of first antennas 100 are antennas mounted on the smart antenna module for the vehicle before the cellular antenna 200 is added. For example, the plurality of first antennas 100 are configured to include a V2X antenna 110*a*, a GNSS antenna 100*b*, a WIFI antenna 100*c*, and an LPWA antenna 100*d*.

The plurality of first antennas 100 may be configured as various types of antennas such as a radiation pattern directly formed on the base substrate 300, a radiation pattern formed on a separate substrate separated from the base substrate 300, a patch antenna formed by stacking the radiation patch on a dielectric, and a solenoid antenna in which a coil or a radiation pattern is wound on a magnetic body.

The plurality of cellular antennas 200 are antennas supporting the cellular V2X communication, and are configured as a dipole antenna. The plurality of cellular antennas 200 operate as the cellular V2X antennas resonating in a frequency band of about 600 MHz to 6 GHz through a multiple-input and multiple-output (MIMO) operation.

Hereinafter, the cellular V2X antenna composed of four cellular antennas 200 will be described as an example, and each cellular antenna 200 will be described by being named as a first cellular antenna 200, a second cellular antenna 200, a third cellular antenna 200, and the fourth cellular antenna 200. At this time, two cellular antennas 200 among the four cellular antennas 200 may operate as reception antennas, and the remaining two cellular antennas 200 may operate as transmission antennas.

In addition, the cellular V2X antenna is not limited to the four cellular antennas 200 described as an example in the exemplary embodiment of the present disclosure because the number of cellular antennas 200 required may be changed depending on the manufacturer.

Referring to FIGS. 4 and 5, the cellular antenna 200 is configured to include a guide substrate 210, a radiator 230, and a ground wire 250.

The guide substrate 210 may be formed of a polyhedron having a plurality of surfaces on which the radiator 230 is mounted. For example, the guide substrate 210 is formed of a hexahedron to facilitate the surface mounting of the radiator 230. At this time, the guide substrate 210 may be variously deformed as long as it has a shape capable of mounting the radiator 230.

The guide substrate 210 supports the radiator 230. At this time, the guide substrate 210 has, for example, the radiator 230 mounted on the surface. In other words, the guide substrate 210 is mounted on the base substrate 300 to support the radiator 230 mounted on the surface.

A plurality of guide protrusions 211 may be formed on the guide substrate 210 in order to easily mount and firmly support the radiator 230. The plurality of guide protrusions 211 are formed to protrude outward from the surface of the guide base 210 (i.e., the surface on which the radiator 230 is mounted). At this time, the plurality of guide protrusions 211 may be formed in different shapes so that the radiator 230 may be easily and accurately mounted on the surface of the guide substrate 210.

For example, the guide substrate 210 is made of a non-metal material, and made of a resin material. The guide substrate 210 has one opened surface among the plurality of surfaces constituting the polyhedron and an empty space 212 formed therein.

The guide substrate 210 has an opening formed on one surface facing the base substrate 300 (one surface in contact with an upper surface of the base substrate 300) to have an empty space 212 formed therein. For example, the guide substrate 210 is formed in a rectangular parallelepiped shape having a front surface, a rear surface, an upper surface, a lower surface, a left surface, and a right surface, and has the opening formed on the lower surface facing the upper surface of the base substrate 300.

The guide substrate 210 may have a reinforcing wall connecting at least two inner wall surfaces and formed in the empty space 212 in order to increase the rigidity of the guide substrate 210.

Since the smart antenna for the vehicle is installed in the vehicle, the antennas may be separated from the base substrate 300 by the vibration of the vehicle. In particular, the cellular antenna 200 has a larger size than those of other antennas (i.e., the first antenna 100), thereby being very vulnerable to vibration.

The first antenna 100 is manufactured in a small size, so that even if it is mounted on the base substrate 300 through an SMT process, there is not almost case where a soldered portion is separated by the vibration of the vehicle or the first antenna 100 itself is separated from the base substrate 300, but if the cellular antenna 200 is mounted on the base substrate 300 through the SMT process, the soldered portion is separated by the vibration of the vehicle or the first antenna 100 itself is separated from the base substrate 300 in many cases.

Therefore, according to the exemplary embodiment of the present disclosure, the cellular antenna 200 and the base substrate 300 are coupled in a fitting-coupled manner in order to prevent the cellular antenna 200 from being separated from the base substrate 300.

The guide substrate 210 is formed with a fitting member. The fitting member is formed on one surface facing the base substrate 300. The fitting member may also be formed on the side surface (left side surface and right side surface) of the base substrate 300. The fitting member may be integrally formed with the guide substrate 210.

The fitting member may be composed of a first fitting protrusion 214 formed to protrude from the lower surface of the guide substrate 210 to the outside of the left side surface, and a second fitting protrusion 216 and a third fitting protrusion 218 formed to protrude from the lower surface of the guide substrate 210 to the outside of the right side surface. At this time, the second fitting protrusion 216 and the third fitting protrusion 218 may be formed in a rectangular parallelepiped shape and formed to have a longer length than that of the first fitting protrusion 214. The first fitting protrusion 214 may have an inclination or a round formed on a surface facing the base substrate 300 in order to facilitate fitting.

Therefore, the guide substrate 210 may reduce the vibration of the vehicle delivered to the cellular antenna 200 and facilitate replacement if necessary.

The radiator 230 is configured as a dipole antenna and mounted on the guide substrate 210. The radiator 230 is mounted on the surface of the guide substrate 210. The radiator 230 is mounted on at least one of the surfaces of the guide substrate 210.

A plurality of guide holes are formed in the radiator 230. The plurality of guide holes are formed to correspond to the plurality of guide protrusions 211 formed on the guide substrate 210. When the radiator 230 is mounted on the guide substrate 210, the guide protrusions 211 of the guide substrate 210 are each inserted into the plurality of guide holes. At this time, the end of the guide protrusion 211 passing through the guide hole may be compressed by being heated and pressurized in order to firmly fix the radiator 230. Therefore, the end of the guide protrusion 211 is formed in a disk shape to prevent the radiator 230 from being separated from the guide substrate 210.

Two radiators 230 may be formed separately. In other words, the radiator 230 may be composed of a first radiator 232 and a second radiator 234 disposed to be spaced apart from each other. The first radiator 232 is disposed adjacent to the left of the guide substrate 210, and the second radiator 234 is disposed adjacent to the right of the guide substrate 210. The formation of the first radiator 232 and the second radiator 234 may be the same or different. Here, the shapes and number of radiators 230 may vary depending on a frequency band and characteristics required and therefore, are not limited to the shapes and number shown in the drawings.

The ground wire 250 connects the radiator 230 to the ground (GND). One end of the ground wire 250 is electrically connected to the radiator 230, and the other end of the ground wire 250 is electrically connected to the ground (i.e., a lower ground pattern 324) of the base substrate 300. At this time, when a plurality of radiators 230 are configured, one end of the ground wire 250 may be electrically connected to each of the plurality of radiators 230.

For example, one end of the ground wire 250 is electrically connected to the radiator 230 through soldering, and the other end of the ground wire 250 is configured in the form of a terminal and is connected to a terminal formed on the ground of the base substrate 300.

For example, the base substrate 300 is a print circuit board (PCB) as a substrate on which the plurality of first antennas 100 and the plurality of cellular antennas 200 are mounted.

Referring to FIGS. 6 and 7, the base substrate 300 is classified into a ground area 310 and a non-ground area 330 depending on whether the ground pattern is formed.

The ground area 310 is an area in which the ground pattern is formed among the entire area of the base substrate 300, and positioned in the center of the base substrate 300. The ground area 310 refers to an area in which the ground pattern is formed on at least one of the upper and lower surfaces of the base substrate 300.

The base substrate 300 includes the ground pattern forming the ground area 310. At this time, for example, the ground pattern includes an upper ground pattern 322 formed on the upper surface of the base substrate 300 and a lower ground pattern 324 formed on the lower surface of the base substrate 300.

The upper ground pattern 322 is a grounding pattern formed on the upper surface of the base substrate 300 and is disposed in the center of the upper surface of the base substrate 300. The upper ground pattern 322 is formed to have a predetermined area in the center of the base substrate 300.

The lower surface ground pattern is a grounding pattern formed on the lower surface of the base substrate 300, and is disposed in the center of the lower surface of the base substrate 300. Then, the lower ground pattern is formed to have a predetermined area in the center of the base substrate 300.

The non-ground area 330 is an area in which the ground pattern is not formed among the entire area of the base substrate 300 and surrounds the periphery of the ground area 310. The non-ground area 330 may be classified into an antenna mounting area 332 in which the plurality of cellular antennas 200 are mounted, and a clearance area 334 separating the antenna mounting area 332 from the ground area 310.

Referring to FIG. 8, a plurality of first mounting areas 350 in which the first antenna 100 is mounted and a plurality of second mounting areas 370 in which the cellular antenna 200 is mounted are positioned on the base substrate 300.

The first mounting area 350 is positioned in the ground area 310. The first mounting area 350 is positioned by removing a part of the ground pattern. The first mounting area 350 may also include a part of the non-ground area 300 (i.e., the clearance area 334). An electrode pattern for feeding and grounding the first antenna 100 and an auxiliary radiation pattern for expanding the antenna performance of the first antenna 100 may be formed in the first mounting area 350. Here, the first mounting area 350 may have different sizes, shapes, electrode patterns, auxiliary radiation patterns, etc. depending on the mounted first antenna 100.

The second mounting area 370 is positioned in the non-ground area 330. The second mounting area 370 is positioned in the antenna mounting area 332 of the non-ground area 330. The second mounting area 370 is spaced apart from the ground area 310 by a predetermined interval by the clearance area 334.

A plurality of fitting holes for mounting the cellular antennas 200 are formed in the second mounting area 370. The second mounting area 370 is formed with a first fitting hole 372 into which the first fitting protrusion 214 formed on the guide substrate 210 of the cellular antenna 200 is inserted and fixed, and a second fitting hole 374 into which the second fitting protrusion 216 and the third fitting protrusion 218 formed on the guide substrate 210 of the cellular antenna 200 are inserted and fixed. The second mounting area 370 is formed with a through hole 376 through which the ground wire 250 of the cellular antenna 200 penetrates. The through hole 376 is disposed between the first fitting hole 372 and the second fitting hole 374. Referring to FIG. 9, when the cellular antenna 200 is mounted on the base substrate 300, the other end of the ground wire 250 penetrates the through hole 376 and is electrically connected to the lower surface ground pattern.

As described above, the smart antenna for the vehicle according to the exemplary embodiment of the present disclosure arranges the plurality of first antennas 100 in the ground area 310, arranges the plurality of cellular antennas 200 in the non-ground area 330, and arranges the plurality of cellular antennas 200 to be spaced apart from the ground pattern through the clearance area 334 of the non-ground area 330, thereby minimizing the interference between the cellular antennas 200. Therefore, as shown in FIG. 10, the isolation performance between the cellular antennas 200 installed in the smart antenna module for the vehicle according to the exemplary embodiment of the present disclosure has the isolation performance of about 6 dB, is measured as about 16 dB to 22 dB, and satisfies the isolation performance required by the automobile industry.

Although the preferred exemplary embodiments of the present disclosure have been described above, it is understood that the present disclosure may be modified in various forms, and those skilled in the art may practice various modified examples and changed examples without departing from the scope of the claims of the present disclosure.

The invention claimed is:

1. A smart antenna module for a vehicle comprising:

a base substrate having a ground area disposed in a center thereof and a non-ground area disposed on an outer circumference of the ground area;

a first antenna disposed in a first mounting area positioned in the ground area of the base substrate;

another first antenna disposed in a first mounting area included the ground area of the base substrate and a clearance area of the non-ground area; and a cellular antenna disposed in a second mounting area positioned in the non-ground area of the base substrate, wherein the cellular antenna further comprises a ground wire, wherein one end of the ground wire is electrically connected to a radiator of the cellular antenna, and wherein the other end of the ground wire is configured in the form of a terminal, and is penetrated the base substrate to connect to the ground area formed on a lower surface of the base substrate.

2. The smart antenna module of claim 1, wherein the base substrate comprises:

an upper ground pattern formed in the ground area of an upper surface of the base substrate; and a lower ground pattern formed in the ground area of a lower surface of the base substrate.

3. The smart antenna module of claim 1, wherein the second mounting area is formed with one or more fitting holes into which a fitting protrusion of the cellular antenna is inserted and fixed; and a through hole through which a ground wire of the cellular antenna penetrates.

4. The smart antenna module of claim 3, wherein the fitting hole comprises:

a first fitting hole into which one fitting protrusion formed on one side of the cellular antenna is inserted; and a second fitting hole into which another fitting protrusion formed on the other side of the cellular antenna is inserted, and wherein the through hole is disposed between the first fitting hole and the second fitting hole.

5. The smart antenna module of claim 1, wherein the clearance area is disposed between the antenna mounting area and the ground area to separate the antenna mounting area from the ground area.

6. The smart antenna module of claim 1, wherein the cellular antenna comprises: a guide substrate of a polyhedral shape having an opening formed in one surface facing the base substrate and mounted with a radiator.

7. The smart antenna module of claim 6, wherein an empty space is formed inside the guide substrate.

8. The smart antenna module of claim 6, wherein the guide substrate is formed with a guide protrusion on a surface on which the radiator is mounted.

9. The smart antenna module of claim 6, wherein the guide substrate comprises: a fitting protrusion fitted into and coupled to a fitting hole formed in the non-ground area of the base substrate.

10. The smart antenna module of claim 9, wherein the fitting protrusion comprises:

a first fitting protrusion formed on one side of the guide substrate and fitted into and coupled to a first fitting hole formed in the non-ground area of the base substrate; and a second fitting protrusion formed on the other side of the guide substrate and fitted into and coupled to a second fitting hole formed in the non-ground area of the base substrate.

* * * * *